(12) United States Patent
Blank et al.

(10) Patent No.: US 12,275,621 B2
(45) Date of Patent: Apr. 15, 2025

(54) CONTROL UNIT AND METHOD FOR OPERATING A CONVEYING MEANS

(71) Applicant: JOHANNES HUEBNER FABRIK ELEKTRISCHER MASCHINEN GMBH, Giessen (DE)

(72) Inventors: Thomas Blank, Reichshof (DE); Manfred Martis, Wetzlar (DE)

(73) Assignee: JOHANNES HUEBNER FABRIK ELEKTRISCHER MASCHINEN GMBH, Giessen (DE)

( * ) Notice: Subject to any disclaimer, the term of this patent is extended or adjusted under 35 U.S.C. 154(b) by 181 days.

(21) Appl. No.: 17/800,782

(22) PCT Filed: Feb. 4, 2021

(86) PCT No.: PCT/EP2021/052608
§ 371 (c)(1),
(2) Date: Aug. 18, 2022

(87) PCT Pub. No.: WO2021/165044
PCT Pub. Date: Aug. 26, 2021

(65) Prior Publication Data
US 2023/0100751 A1   Mar. 30, 2023

(30) Foreign Application Priority Data
Feb. 21, 2020 (DE) .................... 10 2020 104 603.0

(51) Int. Cl.
*B66C 13/30*   (2006.01)
*B65G 43/04*   (2006.01)
(Continued)

(52) U.S. Cl.
CPC .............. *B66C 13/30* (2013.01); *B65G 43/04* (2013.01); *G05D 1/00* (2013.01); *G05D 3/10* (2013.01);
(Continued)

(58) Field of Classification Search
CPC .... G06Q 30/00; G06Q 30/06; G06Q 30/0635; B65H 7/10; B65H 7/14; B65H 9/00; B65H 9/02; H04N 5/232
See application file for complete search history.

(56) References Cited

U.S. PATENT DOCUMENTS

2011/0046775 A1* 2/2011 Bailey ........................ B07C 3/02
700/224
2015/0324893 A1* 11/2015 Langen ................. B65B 43/145
705/26.81
(Continued)

FOREIGN PATENT DOCUMENTS

DE    2154708 B1    2/1973
DE    19910933 A1   9/2000
(Continued)

*Primary Examiner* — Van T Trieu
(74) *Attorney, Agent, or Firm* — Dickinson Wright PLLC; Andrew D. Dorisio

(57) ABSTRACT

A method and control unit for operating conveyor means, the conveyor means comprising a drive unit, a control unit, a carriage moved along a rail by the drive unit, the control unit being controlled by a control device, a rotary encoder connected to a shaft of the drive unit or of a measuring wheel of the carriage and registering a rotation of the shaft, a rotation angle signal and/or a rotational speed signal being transmitted to the control device by an encoder device to determine an assumed position of the carriage on the rail. At least one position signal is detected by a sensor apparatus disposed on the carriage and the rail, a real position of the carriage on the rail being determined using the position signal by a safety apparatus, the assumed position being corrected according to the real position by the safety device.

19 Claims, 5 Drawing Sheets

(51) Int. Cl.
   *G05D 1/00* (2006.01)
   *G05D 3/10* (2006.01)
(52) U.S. Cl.
   CPC ............... *B65G 2203/0283* (2013.01); *B65G 2203/0291* (2013.01); *B65G 2203/046* (2013.01); *B65G 2811/0621* (2013.01); *B65G 2811/095* (2013.01)

(56) References Cited

U.S. PATENT DOCUMENTS

2019/0135003 A1* 5/2019 Pfeffer .................. B41J 25/316
2019/0327394 A1* 10/2019 Ramirez Luna ....... H04N 23/51

FOREIGN PATENT DOCUMENTS

| | | |
|---|---|---|
| DE | 10206893 A1 | 8/2003 |
| DE | 10333276 A1 | 2/2005 |
| DE | 102010040801 A1 | 3/2012 |
| DE | 102013202413 A1 | 8/2014 |
| DE | 102015224337 A1 | 6/2017 |
| EP | 3505874 A1 | 7/2019 |
| JP | H06278991 A | 10/1994 |
| WO | 2004077177 A1 | 9/2004 |

* cited by examiner

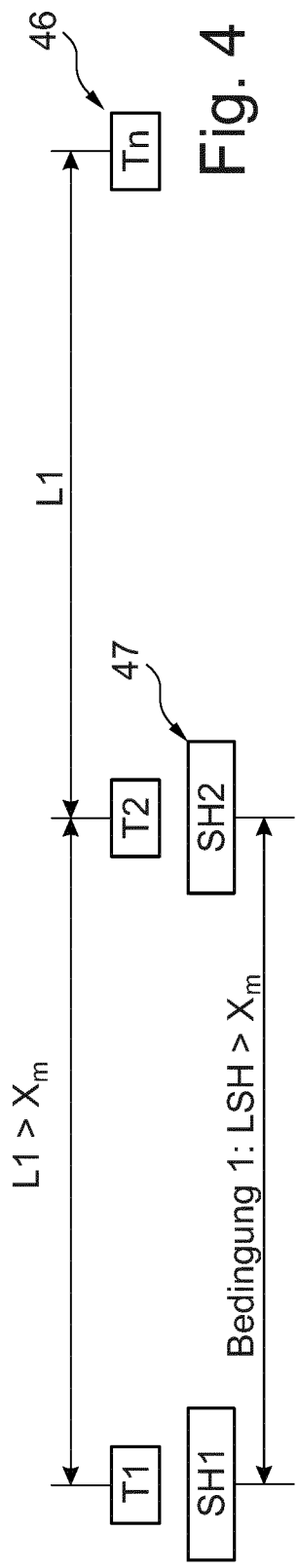
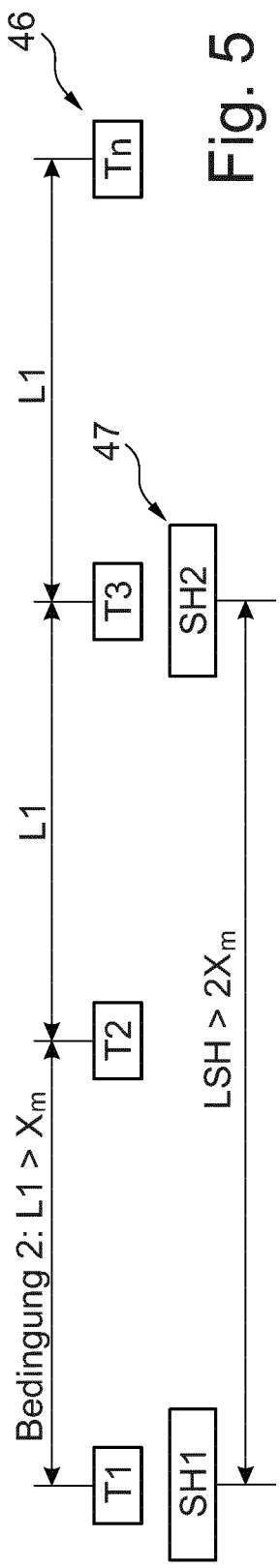
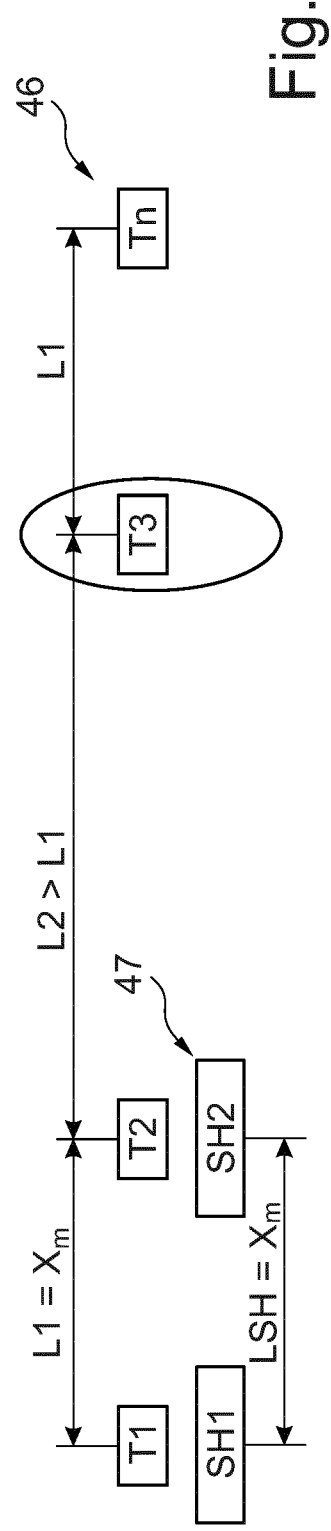

CONTROL UNIT AND METHOD FOR OPERATING A CONVEYING MEANS

TECHNICAL FIELD

The invention relates to a control unit for conveyor means and to a method for operating conveyor means, in particular hoisting gear, cranes, gantry cranes, container cranes or the like, the conveyor means comprising a drive unit and a control unit for controlling the drive unit, a carriage of the conveyor means being moved along a rail of the conveyor means by means of the drive unit, the control unit being controlled by means of a control device of the control unit, a rotary encoder of the control unit being connected to a shaft of the drive unit or of a measuring wheel of the carriage and registering a rotation of the shaft, a rotation angle signal, a rotational speed signal and/or a position signal being transmitted to the control device by means of an encoder device of the rotary encoder in order to determine an assumed position of the carriage on the rail.

BACKGROUND

Control units and methods of this kind are sufficiently known from the state of the art and are essentially used for registering the position of a carriage of conveyor means. A rotary encoder of a control unit comprises at least one shaft which can be coupled with a machine or is directly disposed on a shaft of a drive unit or of a measuring wheel of the carriage. Furthermore, the rotary encoder comprises a mechanical, optical, magnetic, inductive or capacitive encoder device or registration element. The encoder device can be formed by an incremental encoder or an absolute encoder, for example. In a mechanical embodiment, the encoder device can be a switch or a counter. The encoder device can obtain signals, such as a rotation angle signal or a rotational speed signal, for a rotation of the shaft. From these signals, a rotation angle position of the shaft or a rotational speed of the shaft is determinable by means of a control device of the control unit to which the rotary encoder is connected via a signal line. A position of the carriage, in turn, can be determined from a number of revolutions of the shaft or a rotation angle position relative to a reference. This position is an assumed position as it is an indirect measurement.

It is in particular necessary to determine a position when the conveyor means are designed having a carriage moveable along a rail. The carriage can, for example, be designed as a bridge of a gantry crane and span two parallel rails. The carriage can also be designed as a crab and be moveable along an individual rail. This individual rail can be formed from a jib boom of a crane or a bridge of a gantry crane. The carriage can also have a rope winch which can lift loads. The bridge, the crab and the rope winch can be controlled via the control unit. Hence, conveyor means commonly dispose over several drives or electric motors so that a number of rotary encoders can be installed on the conveyor means. The control device forms a control unit in conjunction with the rotary encoders, the control unit controlling the drive unit or the corresponding drives in dependence of a work task.

For the conveyor means or hoisting gear known from the state of the art, the control device is commonly disposed in a control cabinet of the conveyor means and can be realized as a programmable logic controller (PLC), the control device being able to be programmed via an external programming device, such as a standardized computer. In the programmable logic controller or control device, a processing apparatus is integrated which can further process a rotation angle signal and a rotational speed signal of rotary encoders of the conveyor means and converts them such that it is possible to control the drives dependent on position and/or on rotational speed via the control device. A disadvantage is that the programmable logic controller must always be programmed individually. This programming of the control device has to always take into consideration applicable safety regulations, meaning an individual test of the control device realized thus must always be conducted for safety reasons. Since conveyor means for large loads are commonly custom-built machines, a cumbersome adjustment of the programming of the control device to the corresponding equipment of the conveyor means having rotary encoders is necessary.

In particular for hoisting gear, such as container bridges and container crane installations, a precise positioning of the corresponding load is of great importance. A precise positioning can only take place, however, if the position of the carriage relative to a reference is precisely known. Via a rotary encoder connected to a shaft of the drive unit or of a measuring wheel of the carriage, an assumed position of the carriage can be calculated or indirectly measured relative to the reference. Adverse environmental conditions, special loads or just oil between the rail and the carriage can lead to the actual position of the carriage being wrongly determined. This can lead to, for example, slippage between the carriage or the drive unit or the measuring wheel and the rail if the carriage is moved or accelerated on the rail. Consequences can include wrong positioning of a load, collision of several carriages moved on a shared rail and a time-consuming new referencing of the position of the carriage.

SUMMARY

The object of the invention at hand is therefore to propose a method for operating conveyor means and a control unit as well as conveyor means by means of which the conveyor means can be operated more efficiently.

For the method for operating conveyor means, in particular hoisting gear, cranes, gantry cranes, container cranes or the like, the conveyor means comprises a drive unit and a control unit for controlling the drive unit, a carriage of the conveyor means being moved along a rail of the conveyor means by means of the drive unit, the control unit being controlled by means of a control device of the control unit, a rotary encoder of the control unit being connected to a shaft of the drive unit or of a measuring wheel of the carriage and registering a rotation of the shaft, a rotation angle signal, a rotational speed signal and/or a position value being transmitted to the control device by means of an encoder device of the rotary encoder in order to determine an assumed position of the carriage on the rail, at least one position signal being detected by means of a sensor apparatus of a safety device of the control unit disposed on the carriage and the rail, a real position of the carriage on the rail being determined using the position signal by means of a safety apparatus of the safety device, the assumed position being corrected according to the real position by means of the safety device.

In the method according to the invention, the control unit comprises the safety device by means of which a position or the real/actual position of the carriage on the rail can be determined. The carriage can be, for example, a bridge or a crab of the conveyor means or of a crane, which is moved along the rail or a running rail of the conveyor means. For determining the position of the carriage on the rail, the rotary encoder known from the state of the art or rather the encoder device of the rotary encoder is provided. The rotary encoder is directly or indirectly coupled with the shaft of the measuring wheel or a non-driven carriage wheel or with the shaft of the drive unit or with a driven carriage wheel or a powertrain. Via the rotation angle signal, the rotational speed signal and/or the position value of the encoder device, the assumed or presumed position of the carriage on the rail can be determined by means of the control device. The encoder device can also convert the rotation angle signal and/or the rotational speed signal to the position value if a diameter of the measuring wheel or the carriage wheel is known. The control device, which can also be designed as a programmable logic controller, calculates the position of the carriage on the rail or the assumed position from the corresponding signals, the position which is correspondingly indirectly determined being able to be wrong. By means of the safety device, the real or actual position of the carriage on the rail is determined at least in sections in supplementation. The real position is determined using the sensor apparatus by means of which a position signal can be detected in sections or at points when moving the carriage on the rail. The safety apparatus can determine the actual position or real position of the carriage on the rail based on the position signal, in particular since the sensor apparatus requires the real existence of the carriage at the corresponding position of the rail in order to generate the position signal. Furthermore, it is now possible that the safety device corrects the assumed position, which can be wrong owing to slippage between the carriage and the rail, for example, according to the real position if the assumed position deviates from the real position. Overall, it is thus possible to check at least sections of the assumed position, which is continuously registered via the encoder device, and to correct it accordingly. A precision when determining the position is thus improved using simple means and error proneness or a malfunction of the conveyor means can be reduced.

The safety apparatus can correct the rotation angle signal, the rotational speed signal and/or the position value according to the real position and transmit this information to the control device for controlling the drive unit. The safety apparatus can be designed as its own component group which comprises means for data processing. The safety apparatus can be integrated in a control cabinet or in the rotary encoder.

The rotary encoder can be connected to the shaft of the drive unit, the safety apparatus being able to determine the assumed position and compare it to the real position, the safety apparatus being able to determine a slippage of the drive unit based on the comparison. The shaft can be a drive shaft of an electric motor of the drive unit, for example, with which the rotary encoder is directly or indirectly coupled. When the real position of the carriage is determined via the safety apparatus, the assumed position of the carriage calculated from the rotation angle signal, the rotational speed signal and/or position value of the rotary encoder can be compared to the real position. If there is a deviation between the corresponding positions, a slippage of the drive unit can be assessed and the assumed position can be corrected according to the real position.

Furthermore, the safety apparatus can process the rotation angle signal, the rotational speed signal and/or the position value of the rotary encoder and determine whether a threshold of an acceleration has not been met or has been exceeded and can detect a slippage of the drive unit when the threshold has not been met. For the acceleration of the shaft of the drive unit, one threshold or, depending on the application case, several thresholds can be predetermined. The threshold can also be a dynamic threshold if, for example, different loads can be accelerated depending on the corresponding load. If the rotary encoder or rather the encoder device detects at the shaft of the drive unit that the threshold is exceeded, for example in the manner of an acceleration jump, it is to be assumed that the respective load in fact cannot be accelerated as measured and thus a slippage of the drive unit must present. It is also possible to detect when the threshold is not met or is exceeded as an integral cumulative value over a period of time. The slippage can have occurred via a drive wheel sliding or overspinning on the rail.

Alternatively, the rotary encoder can be connected to the shaft of the measuring wheel, another rotary encoder of the safety device being able to be connected to the shaft of the drive unit, the safety device being able to compare the rotation angle signal, the rotational speed signal and/or the position value of the rotary encoder to a rotation angle signal, a rotational speed signal and/or a position value of the other rotary encoder, a slippage of the drive unit being able to be determined based on the comparison. Consequently, the rotary encoder is connected to or coupled with the shaft of the measuring wheel if one is available. The measuring wheel is moved together with the carriage and rolls off on the rail, for example. Since the measuring wheel does not serve to drive the carriage, slippage of the drive on the measuring wheel can at least be ruled out confidently. Nonetheless, malfunction of the measuring wheel, such as locking, can cause slippage. The other rotary encoder is disposed on the shaft of the drive or an electric motor, meaning the corresponding rotation angle signals, rotational speed signals and/or position value of the corresponding rotary encoders can be compared by means of the safety device. If the signals deviate from one another, it can be assessed that a drive wheel of the drive unit on the rail is moved in deviation to the measuring wheel. It can be further intended for the safety device to determine a value for slippage of the drive unit or the drive wheel based on the comparison of the corresponding signals. In addition, one or several thresholds can be stored in the safety device for slippage. For instance, a slippage warning and a degraded operation can be induced when a first threshold is exceeded. When a second threshold is exceeded, a slippage warning can be triggered as a result of which emergency operation or a complete shut-down can be initiated. Different causes can be the reason for why both thresholds have been exceeded. It can include serious system errors, drive errors, changed environmental conditions or errors in the drive control. Slippage warnings and slippage alarms can be signaled by signaling the corresponding status via the digital outlets (including relay-controlled switching outputs) or via secured field bus data. During downgraded operation, optical and/or acoustic warning signals in addition to speed reduction may be required to protect people.

The safety device or the safety apparatus can limit a maximal threshold rotational speed to a reduced threshold rotational speed of the drive unit when slippage occurs and transmit the reduced threshold rotational speed to the control device in order to control the drive unit, the maximal threshold rotational speed being able to be cleared via the safety device or rather safety apparatus when the real position of the carriage on the rail can be determined. The safety device or rather the safety apparatus to can thus convert regular operation of the drive unit to emergency operation. The rotational speed of the drive unit can be limited in such a manner that the carriage can only be moved comparatively slowly along the rail. This reduced threshold rotational speed can be used for controlling the drive unit until a position signal can be detected by means of which the real position of the carriage on the rail is determinable. After, it is possible again to correct the assumed position falsified by the slippage according to the real position.

The safety device or rather the safety apparatus can continuously determine the slippage and/or the real position of the carriage. This presumes that a sufficient number of position signals can be detected for calculating or determining the real position or that the sensor device is designed such that a position signal is available essentially in every position of the carriage on the rail. Nevertheless, it is also possible for the sensor apparatus to be designed such that position signals are only available in sections or certain distances on the rail.

The safety device or rather the safety apparatus can determine a speed and/or a constancy of the speed from the rotation angle signal, the rotational speed signal and/or the position value, the safety device or rather the safety apparatus being able to determine the wear of the carriage. Hence, slippage and wheel wear of the carriage can be easily distinguished, which facilitates maintenance of the conveyor means. When a driving speed is constantly low, slippage is commonly not expected, for which reason a difference in position can only be ascribed to wear of the carriage. The control unit can then signal wheel wear, for example, and thus initiate the implementation of maintenance.

The position signal can be generated at least by means of a sensor of the sensor apparatus disposed on the carriage when markings of the sensor apparatus disposed on the rail have been passed. It is essential that the sensor is designed such that it can detect the markings on the rail. In general, all types of sensors and markings can be used which co-operate with known physical active principles.

The safety device can be calibrated by passing all markings with the sensor, the real positions of the markings being able to be determined and stored in the safety apparatus. The safety device can be calibrated, for example, during a silent running of the carriage on the rail during which the markings on the rail are passed or traversed and thus detected. The actual or real positions of the markings can be stored, for example in a lookup table of the safety apparatus. The safety apparatus can process the position data particularly quickly, whereby a barely delayed control of the drive unit by means of the control device becomes possible. To calibrate the safety device, the stored real positions of the markings can also be compared again to the actually determined real positions of the markings. The safety device can overwrite the stored real position of the marking again in the storage medium upon passing a marking and thus repeat its calibration. In the event that a marking cannot be determined at the stored real position, then a malfunction of the marking or of the corresponding sensor or slippage can be the cause. The safety device can then control the drive unit at a reduced threshold rotational speed or in emergency operation.

The sensor device can comprise at least two sensors disposed on the carriage and a plurality of markings disposed along the rail, passive RFID transponders being able to be used as markings and RFID transceivers being able to be used as sensors. The sensors must always be disposed on the carriage in such a manner that a path connecting the sensors extends towards the rail or at least parallel to the rail. If the sensors are designed as RFID transceivers and the markings are designed as RFID transponders, it becomes possible to safely detect the position signal even under adverse environmental conditions. In contrast to, for example, optical or magnetic sensors, RFID transponders are influenced only very little by visibility, impurities, wetness or similar interfering factors. Passive RFID transponders also do not require their own power supply, making retrofitting a rail with an RFID transponder, for instance via adhesion, possible. Moreover, systems of this kind are available at particularly little cost.

Upon passage, a position point or a center point midway or on the path between an entry point and an exit point of a receiver area of the RFID transponder can be defined, the safety apparatus being able to use the position point and/or entry point and the exit point for determining the real position. The entry point and the exit point are defined by the first and the last contact of the RFID transceiver with the RFID transponder when the carriage traverses or passes the RFID transponder using the RFID transceiver. If this passing takes place at a constant speed, the distance between the entry point and the exit point and thus the position point can be detected as the actual position of the RFID transponder. It can also be assessed in which direction the carriage is actually moving. A marking can correspondingly represent three detectable points on the rail and the safety apparatus can use these three points for determining the position and the direction. The real position of the carriage can thus be determined even more precisely.

According to a first embodiment, sensors disposed on the carriage at a relative distance LS and markings disposed on the rail at a relative distance L can be used, the following holding true: LS=L or LS>L, preferably LS=n*L with n=1, 2, 3, . . . . The distance of the markings accordingly can correspond to the distance of the sensors or the distance of the sensors can be larger than the distance of the markings, e.g., twice as large as the distance of the markings. It can be intended that relative distance L of the markings is always the same size and that the markings are dispersed over the entire length of the rail. Thus, it becomes possible to essentially always determine the real position of the carriage on the rail.

According to a second embodiment, sensors disposed on the carriage at a relative distance LS and markings disposed on the rail at a relative distance $L_1$ and $L_2$ can be used, the following holding true: LS=n*L1 and $L_1 < > L_2$, preferably LS=$L_1$ and $L_1 < L_2$. The markings are disposed at uneven distance along the rail and it can also be intended that sections of the sensors are moved on the rail between two markings or rather relative distance $L_2$. In this area, the real position of the carriage cannot be determined. Markings can be forgone in particular in the instance when sections of the rail do not require precisely determining the position or high safety is required.

According to a third embodiment, sensors disposed on the carriage at a relative distance LS and markings disposed on the rail at a relative distance L can be used, the following holding true: LS≠L or LS=9/10 L. For instance, it can be intended for the arrangement and the ratio of the sensors to the markings to be realized like a nonius. In this context, two, three or more sensors can be disposed in a row on the carriage. Thus, comparatively few markings can be disposed on the rail while still achieving a particularly high precision when determining the real position of the carriage.

By means of the safety apparatus, a switch signal of an end switch of the sensor apparatus can be registered and be transmitted to the control device for controlling the drive unit. The end switch, which can be on the corresponding ends of the rail, can be a mechanical end switch which is the safety apparatus. Alternatively, it is also possible to use a marking as an end switch in each case. The end switches ensure that the corresponding ends of the rail cannot be traversed by the carriage. The switch signal of the end switch is transmitted from the safety apparatus to the control device which initiates switching off the drive unit or stopping the carriage.

The control unit according to the invention for conveyor means in particular hoisting gear, cranes, gantry cranes, container cranes or the like, the conveyor means comprise a drive unit and a control unit for controlling the drive unit, a carriage of the conveyor means being movable along a rail of the conveyor means by means of the drive unit, the control unit comprising a control device by means of the control unit is controllable, the control unit comprising a rotary encoder which is connectable to a shaft of the drive unit or of a measuring wheel of the carriage for registering a rotation of the shaft, the rotary encoder comprising an encoder device by means of which a rotation angle signal, a rotational speed signal and/or a position value is transmittable to the control device in order to determine an assumed position of the carriage on the rail, the control unit having a safety device having a sensor apparatus positionable on the carriage and the rail, at last one position signal being detectable by means of the sensor apparatus, the safety device having a safety apparatus by means of which a real position of the carriage on the rail is determinable using the position signal, the assumed position being correctable according to the real position by means of the safety device.

In particular, the rotary encoder can have the safety apparatus. The safety apparatus can be integrated in the rotary encoder. Consequently, the rotary encoder receives the position signal of the sensor apparatus and processes it by means of data processing in conjunction with the rotation angle signal and/or the rotational speed signal in such manner that the assumed position can be corrected according to the real position of the safety apparatus of the rotary encoder. The corrected position or rather a correspondingly corrected rotation angle signal and/or rotational speed signal can be transmitted to the control device which in turn further processes it directly for controlling the drive unit without special individual programming of the control device being required for merging the corresponding signals. Thus, the rotary encoder can also be a standardized rotary encoder which only requires a one-time safety inspection regarding its signal processing or programming. A programmable logic controller of the control device can thus be programmed at significantly less effort as the safety apparatus does not have to be integrated in the programmable logic controller. The signal processing in the rotary encoder also achieves a faster processing speed of the control unit as the control device no longer has to process position signals. It is also particularly advantageous that already available conveyor means can be retrofit with the rotary encoders having the safety apparatus. In this instance, it is also no longer necessary to renew a safety certificate of a control device or of a programmable logic controller as it can remain unchanged.

Advantageously, the rotary encoder can have a field bus interface and/or a switching output for exceeding or not meeting a scaled output value cagable of parametrization and/or dependent on position. Generally, the rotary encoder can be easily coupled to the control device using a field bus interface for exchanging data via a field bus. The switching output can be equipped with a safety relay or a semiconductor relay. The output value capable of parametrization can be a rotational speed value, an overspeed and/or underspeed, a rotation angle value or rotational-speed differential value or rotation angle value. Both interfaces can be designed so as to be safety-oriented. One output each can be used for warnings and alarms.

The rotary encoder can be an incremental encoder and/or an absolute encoder. An incremental encoder can be used advantageously when, for example, the rotary encoder is disposed on an electric motor of the drive unit. An incremental signal and/or an absolute signal can be further processed advantageously when the rotary encoder is disposed on the shaft of the measuring wheel. The encoder device can output these signals parallel. The absolute signal can be what is known as a single-turn signal, with reference to an individual rotation of the shaft, or a multi-turn signal, with reference to a plurality of rotations of the shaft. Furthermore, the rotary encoder can have a digital or analog output for an absolute signal or an incremental signal. The analog output can be a current or voltage outlet.

The conveyor means according to the invention, in particular hoisting gear, cranes, gantry cranes, container cranes or the like, comprise a control unit, at least one rail, a carriage moveable along the rail and a drive unit having an electric motor.

BRIEF DESCRIPTION OF THE DRAWINGS

In the following, the invention is described in further detail with reference to the attached drawings.

FIG. 4 shows a first embodiment of a possible relative arrangement of markings and sensors;

FIG. 5 shows a second embodiment of a relative arrangement of markings and sensors;

FIG. 6 shows a third embodiment of a relative arrangement of markings and sensors;

DETAILED DESCRIPTION

Figure 1:
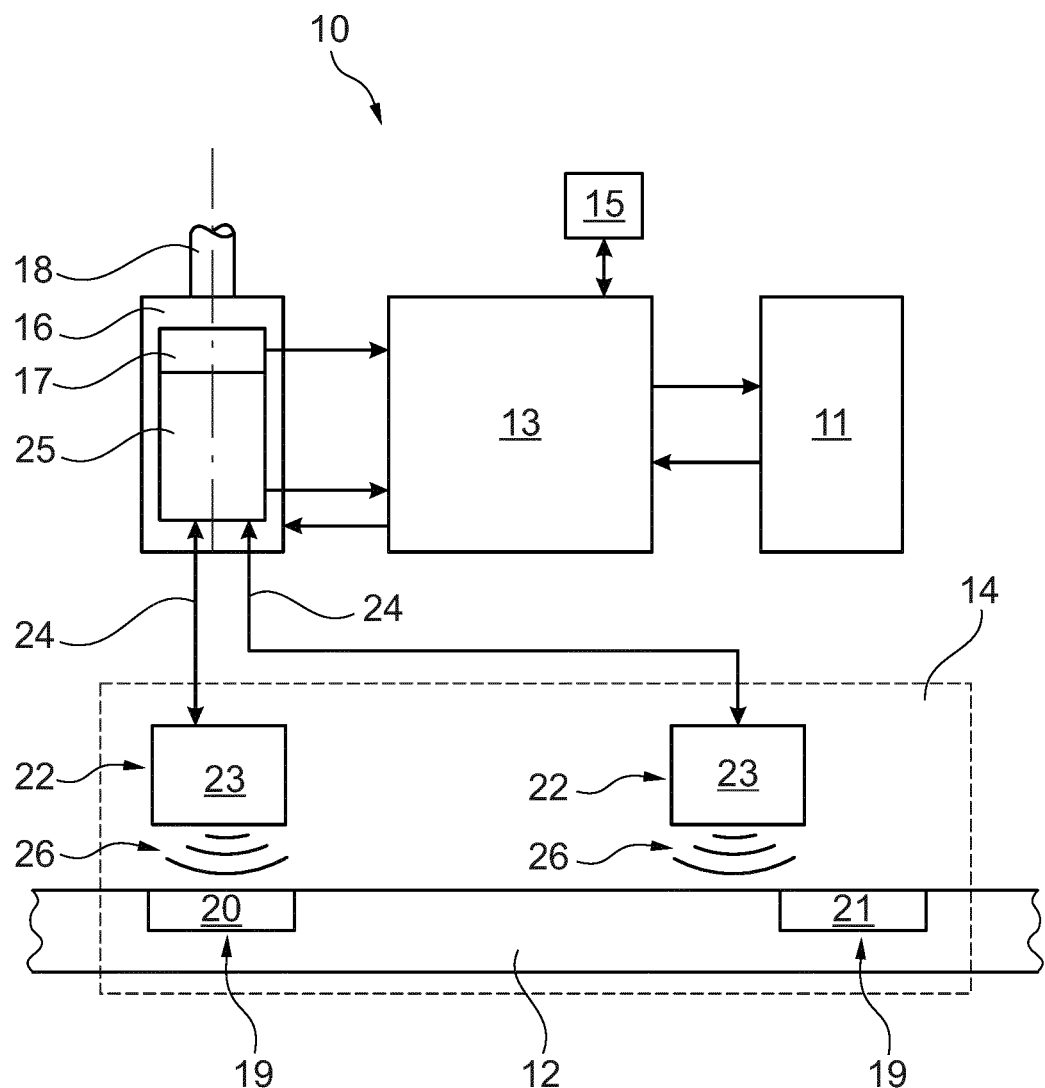
FIG. 1 shows a schematic view of a configuration of a control unit.

FIG. 1 shows a control unit 10 in conjunction with a drive unit 11 and a rail 12 of conveyor means (not further illustrated). Control unit 10 comprises a control device 13, a sensor apparatus 14, a programming device 15 and a rotary encoder 16. Control device 13 can receive a rotation angle signal, a rotational speed signal and/or a position value of an encoder device 17 of rotary encoder 16. Rotary encoder 16 is coupled with drive unit 11 or alternatively a measuring wheel, which abuts against the rail 12, via a shaft 18. Drive unit 11 itself acts on rail 12 via a drive wheel (not illustrated) and thus drives a carriage of the conveyor means which is moveable along rail 12. Drive unit 11 can comprise an electric motor (not illustrated) and a transmission.

Sensor apparatus 14 has a plurality of markings 19 which are designed as RFID transponders 20, 21. Furthermore, sensor apparatus 14 has two sensors 22 which are designed as RFID transceivers. RFID transponders 20, 21 are provided with individual identifiers and are fastened to rail 12. Sensors 22 are disposed on the carriage (not shown) and each connected to a safety apparatus 25 integrated in rotary encoder 16 via cables 24. RFID transceivers 23 each generate an electromagnetic field 26 via which RFID transponders 20, 21 can be detected and position signals can be obtained in each case.

When operating drive unit 11, rotary encoder 16 detects a rotation angle signal, a rotational speed signal and/or a position value via encoder device 17 and transfers them to control device 13. Furthermore, rotary encoder 16 and/or safety apparatus 25 receives a position signal from RFID transceiver 23 and RFID transponder 20, 21. Safety apparatus 25 process the rotation angle signal and/or the rotational speed signal and determines an assumed position of the carriage on rail 12. Furthermore, the position signal makes it possible to determine a real position of the carriage on the rail. Thus, real position information can stored in a storage medium of the safety apparatus 25 for RFID transponder 20, for example in a look-up table. Safety apparatus 25 compares the assumed position to the real position and determines possible slippage of drive unit 11, e.g., caused by a drive wheel overspinning on rail 12. If slippage is detected by safety apparatus 25 or if this slippage is outside of a tolerance area, safety apparatus 25 corrects the assumed position according to the real position. This correction can also take place by the rotation angle signal and/or the rotational speed signal transmitted to control device 13 being corrected or adjusted accordingly. Thus, it is overall possible to safely determine a precise position of the carriage on rail 12.

Figure 2:
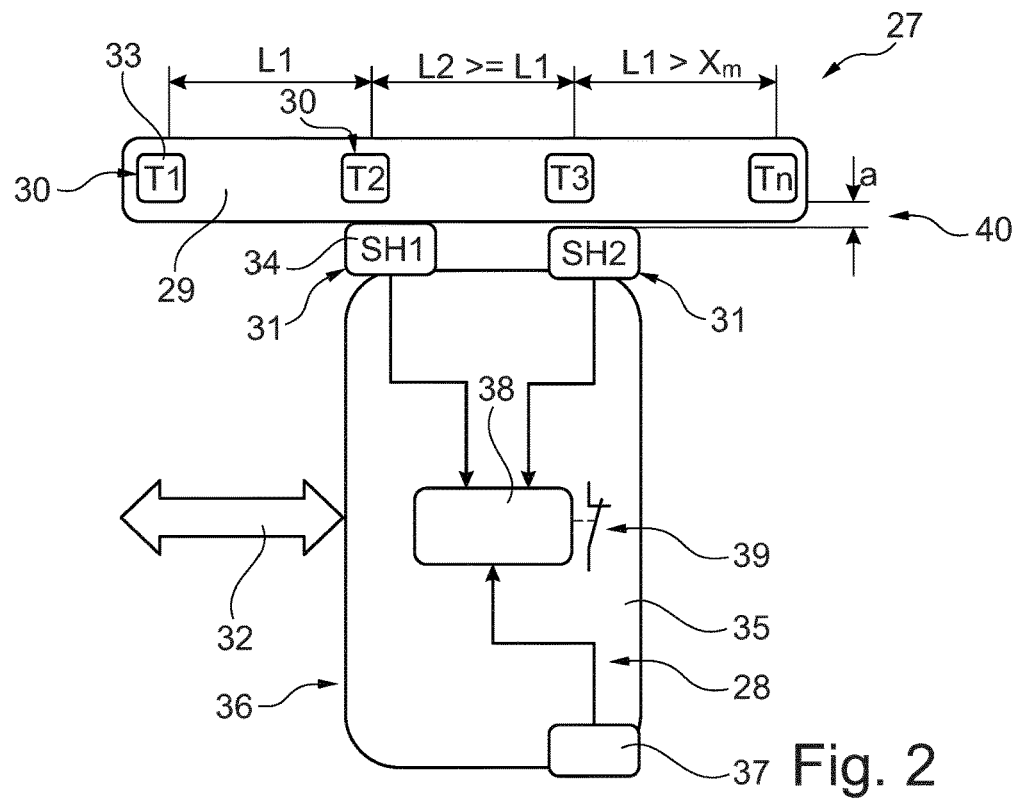
FIG. 2 shows a sectional view of conveyor means.

FIG. 2 shows a schematic view of conveyor means 27 having a carriage 28 and a rail 29. Markings 30 are applied to rail 29 and sensors 31 are applied to carriage 28. Carriage 28 is moveable along rail 29, as indicated by arrow 32. Markings 30 are RFID transponders 33 and sensors 31 are RFID transceivers 34. Carriage 28 is formed by a crane bridge 35. A rotary encoder 36 disposed on crane bridge 35 comprises an encoder device 37 and a safety apparatus 38. Safety apparatus 38 has a safety switch 39. Using encoder device 37, an absolute value of a movement of the crane bridge 35 on rail 39 is detected via a measuring wheel (not shown). Markings 30 are individualized and disposed on rail 39 at distances relative to each other, $X_m$ corresponding to 0.45 m. For a distance A from sensors 31 to markings 30, 100 mm to 200 mm are intended. A storage medium of safety apparatus 38 contains the corresponding relative distances of individualized markings 30. With the aid of markings 30 together with sensors 31, it is possible in all instances to detect a real position of carriage 28 on rail 29 via safety apparatus 28 and a sensor apparatus 40 formed by markings 30 and sensors 31 independently of the function of encoder device 37. A malfunction of encoder device 37 or slippage or a malfunction of sensors 31 and markings 30 can be directly detected by safety apparatus 38. Vis safety switch 39, a drive unit (not shown) can be shut down via safety switch 39.

Figure 3A:
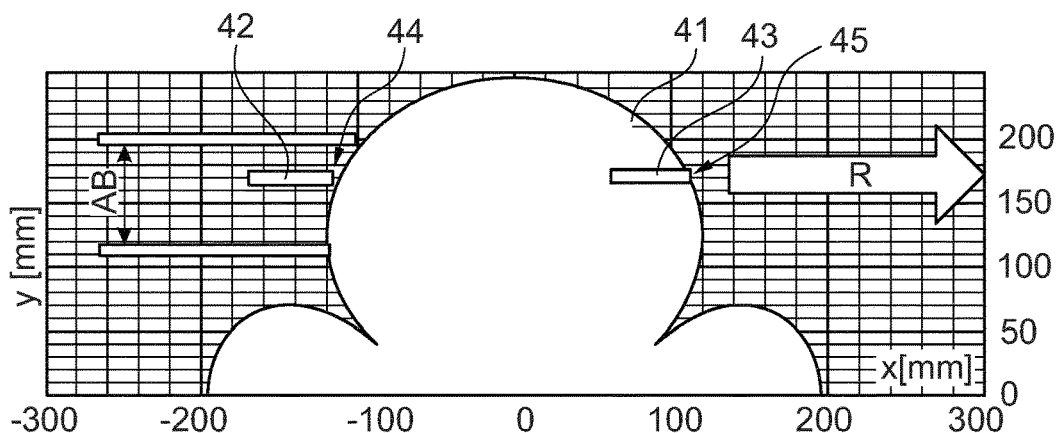
FIG. 3a shows a spatial view of a signal of a marking along with sensors moved in relation thereto.
Figure 3B:
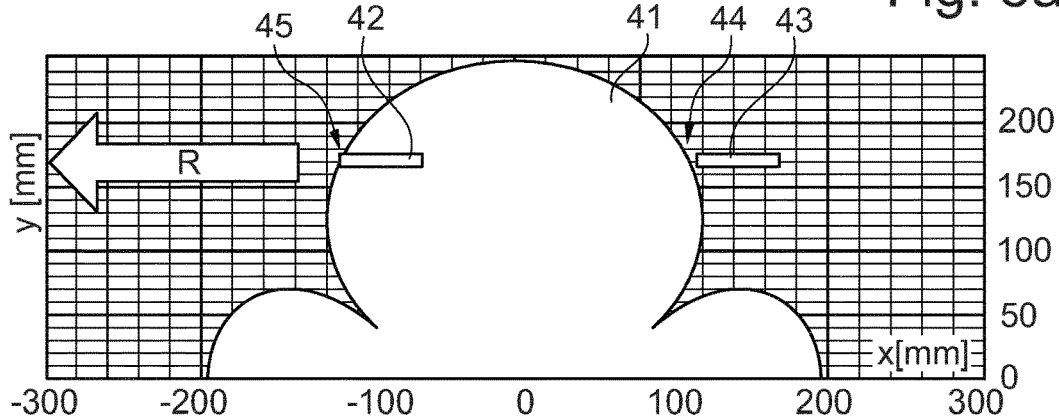
FIG. 3b shows another spatial view of the signal of the marking along with the sensors moved in relation thereto.

FIGS. 3*a* and 3*b* each show a graph of a spatial transceiver 41 of an RFID transceiver (not shown) and RFID transponder 42, 43 disposed in relation thereto. RFID transponders 42, 43 are disposed on a rail (not shown in this case), the RFID transceivers being moved passed RFID transponders 42, 43 in a direction R by moving RFID transceivers. The RFID transceiver is positioned at the origin of the graph and RFID transponders 42 and 43 are positioned in an operational range AB at a distance in the direction of the Y-axis of the graph. When the RFID transceiver is moved in direction R, as shown in FIG. 3*a*, RFID transponder 42 exits transceiver area 41 at an exit point 44 and RFID transponder 43 enters transceiver area 41 at an entry point 45. FIG. 3*b* shows a movement in the opposite direction. Exit point 44 and entry point 45 can be detected by losing or establishing radio contact between the RFID transceiver and RFID transponder 42 and/or 43. This permits precisely determining a position of the RFID transceiver in relation to RFID transponders 42 and 43 and a movement direction in the X-axis.

A combined view of FIGS. 4 to 6 shows different options for a relative arrangement of markings 46 and sensors 47. Distance X indicated here can be 0.3 m or 0.45 m.

Figure 7:
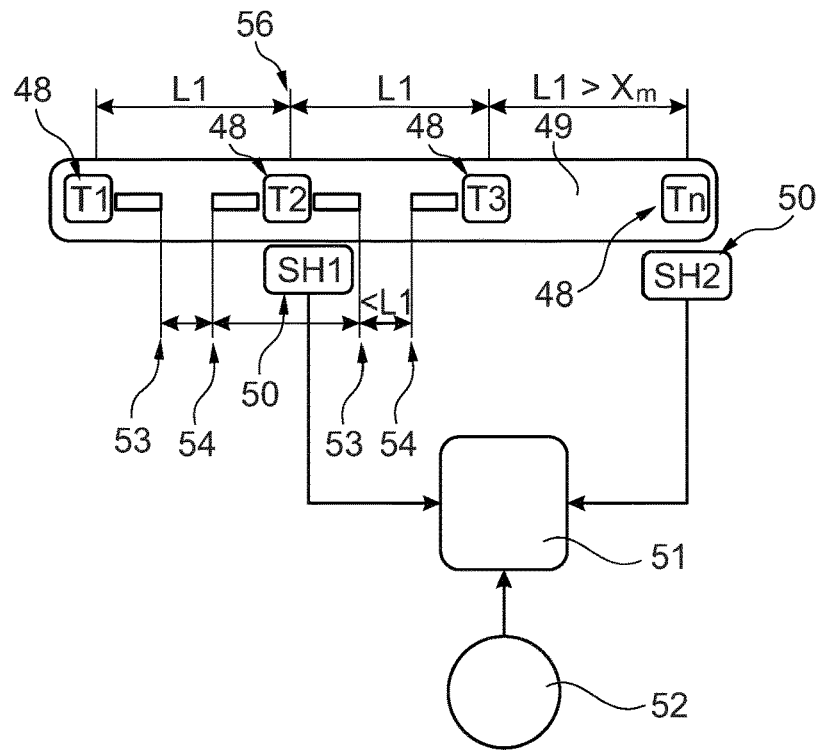
FIG. 7 shows a sectional view of conveyor means having a relative arrangement of markings and sensors.

FIG. 7 shows a schematic view of markings 48 on a rail 49 and sensors 50 moved in relation thereto. Sensors 50 are connected to a safety apparatus 51 which is coupled with an encoder device 52. Safety apparatus 51 identifies exit points 53 and entry points 54 of each marking 48 at transceiver areas (not shown) of sensors 50. Via exit point 53 and entry point 54, a position point 55 of corresponding sensors 50 can be determined. Overall, a marking 48, and thus a position signal, can always be detected via exit points 53, entry points 54 and position points 55 despite a large distance of markings 48.

Figure 8:
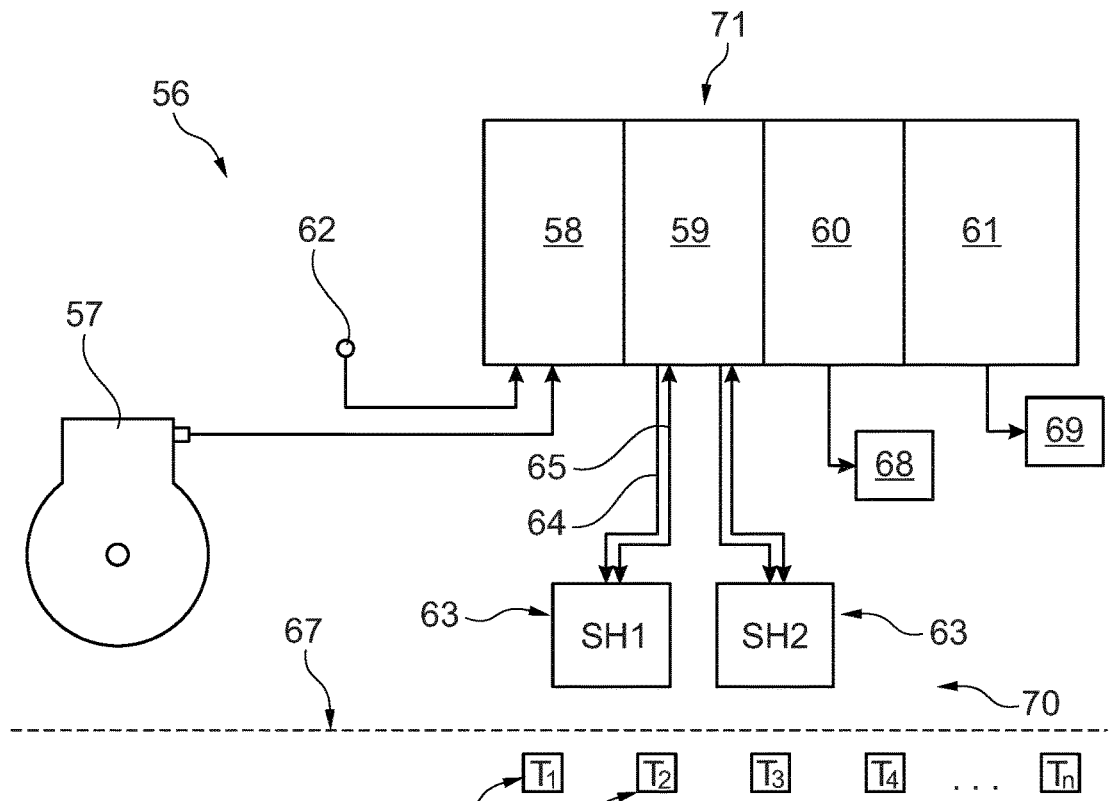
FIG. 8 shows a schematic view of a safety device.

FIG. 8 shows a schematic view of a rotary encoder 56 having a base unit 57 for obtaining a rotary encoder signal, or rather a rotation angle signal and/or a rotational speed signal, of a rotary encoder 58 for processing these signals, of a safety apparatus 59, of a switching output 60 and of a field bus interface 61. Rotary encoder 56 is supplied with electric energy via a voltage source 62. Sensors 63 are each connected to safety apparatus 59 using a supply line 64 and a data line 6. In relation to sensors 63, markings 66 are disposed on a rail 67. Switching output 60 is connected to a relay 68 and field bus interface 61 is connected to a field bus 69. Safety apparatus 59, switching output 60 and field bus interface 61 are designed modularly, meaning they can each be combined with base unit 57 and rotary encoder 58 independently of each other. Hence, rotary encoder 56 can be adapted to many applications as required. Rotary encoder 56 along with safety apparatus 59 and a sensor apparatus 70, which is connected thereto and is formed from sensors 63 and markings 66, comprises a safety device 71.

Figure 9:
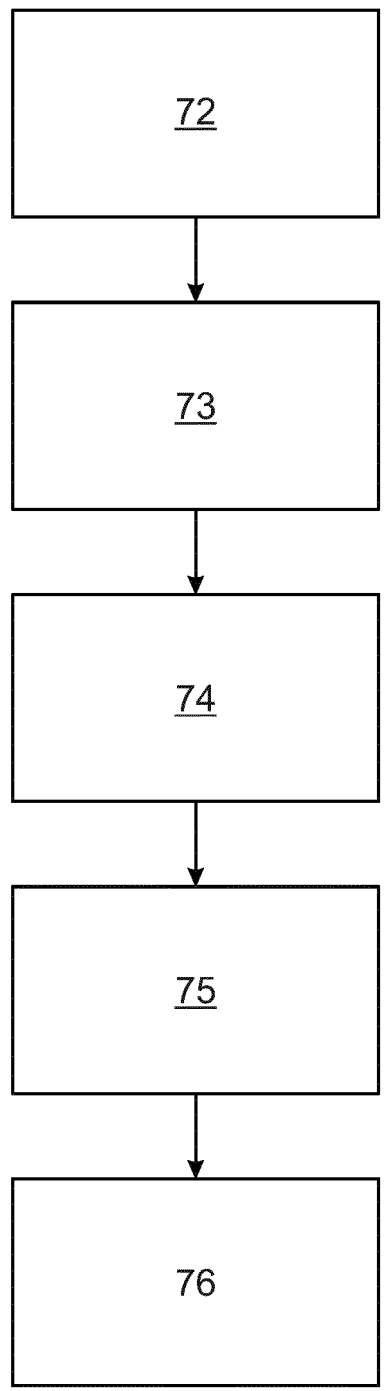
FIG. 9 shows a schematic view of a process sequence for operating conveyor means of a safety device.

FIG. 9 shows a process sequence for an operation of conveyor means, as shown in FIG. 1. In a first method step 72, a system setting is first carried out via a silent running of the carriage over rail 12. In this context, position signals of markings 19 are detected by sensors 22 or rather sensor apparatus 14. The distances of the position signals or rather the markings 19 are stored in safety apparatus 25. The distances are calculated from the rotational angle signal and/or the rotational speed signal of encoder device 17. In method step 73, an acceleration is continuously measured via encoder device 17 and slippage is detected by safety apparatus 25 during acceleration leaps. In method steps 74 and 75, both sensors 22 detect, independently of each other, markings 19 using an entry point, position point and exit point when traversing them, safety apparatus 25 comparing the obtained points to the points stored in method step 72 for each sensor 22 and detecting a deviation where appropriate. In method step 76, an assumed indirectly determined position of the carriage is corrected according to a real position if a deviation of the corresponding points could be detected in method steps 74 and 75.

The invention claimed is:

1. A method for operating conveyor means (27), the conveyor means comprising a drive unit (11) and a control unit (10) for controlling the drive unit, a carriage (28) of the conveyor means being moved along a rail (12, 29, 49, 67) of the conveyor means by means of the drive unit, the control unit being controlled by means of a control device (13) of the control unit, a rotary encoder (16, 36, 56) of the control unit being connected to a shaft (18) of the drive unit or of a measuring wheel of the carriage and registering a rotation of the shaft, a rotation angle signal, a rotational speed signal or a position value being transmitted to the control device by means of an encoder device (17, 37, 52, 58) of the rotary encoder in order to determine an assumed position of the carriage on the rail, wherein at least one position signal is detected by means of a sensor apparatus (14, 40, 70) of a safety device (71) of the control unit, the sensor apparatus being disposed on the carriage and the rail, a real position of the carriage on the rail being determined by means of a safety apparatus (25, 38, 51, 59) of the safety device based on the position signal, the assumed position being corrected according to the real position by means of the safety device, wherein the position signal is generated by means of at least one sensor (22, 31, 47, 50, 63) of the sensor apparatus (14, 40, 70) disposed on the carriage (28) when passing markings (19, 30, 46, 48, 63) of the sensor apparatus disposed on the rail (12, 29, 49, 67), and wherein the sensor apparatus (14, 40, 70) comprises at least two sensors (22, 31, 47, 50, 63) disposed on the carriage (28) and a plurality of markings (19, 30, 46, 48, 63) disposed along the rail (12, 29, 49, 67), passive RFID transponders (20, 21, 33, 42, 43) being used as markings and RFID transceivers (23, 34, 41) being used as sensors.

2. The method according to claim 1,
wherein the safety apparatus (25, 38, 51, 59) corrects the rotation angle signal, the rotational speed signal or the position value according to the real position and transmits this information to the control device (13) in order to control the drive unit (11).

3. The method according to claim 1,
wherein the rotary encoder (16, 36, 56) is connected to the shaft (18) of the drive unit (11), the safety apparatus (25, 38, 51, 59) determining the assumed position, comparing it to the real position and determining a slippage of the drive unit based on the comparison.

4. The method according to claim 1,
wherein the safety apparatus (25, 38, 51, 59) processes the rotation angle signal or the rotational speed signal of the rotary encoder (16, 36, 56) and determines when a threshold of an acceleration is not met or is exceeded and detects a slippage of the drive unit (11) when a threshold is not met.

5. The method according to claim 1,
wherein the rotary encoder (16, 36, 56) is connected to the shaft (18) of the measuring wheel, another rotary encoder of the safety device (71) being connected to the shaft of the drive unit (11), the safety device comparing the rotation angle signal or the rotational speed signal of the rotary encoder to a rotation angle signal, a rotational speed signal or a position value of the other rotary encoder and determining a slippage of the drive unit based on the comparison.

6. The method according to claim 3,
wherein the safety device (71) limits a maximal threshold rotational speed to a reduced threshold rotational speed of the drive unit (11) when slippage occurs and transmits the reduced threshold rotational speed to the control device (13) in order to control the drive unit, the safety device clearing the maximal threshold rotational speed when the real position of the carriage (28) on the rail (12, 29, 49, 67) is determined.

7. The method according to claim 3,
wherein the safety device (71) continuously determines the slippage or the real position of the carriage (28) on the rail (12, 29, 49, 67).

8. The method according to claim 3,
wherein the safety device (71) determines a speed or constancy of the speed from the rotation angle signal, the rotational speed signal or the position value, the safety device determining the wear of the carriage (28).

9. The method according to claim 1,
wherein the safety device (71) is calibrated via all markings (19, 30, 46, 48, 63) being passed with the sensor (22, 31, 47, 50, 63), the real positions of the markings being determined and being stored in the safety apparatus (25, 38, 51, 59).

10. The method according to claim 1,
wherein a position point (55) is defined halfway between an entry point (45, 54) and an exit point (44, 53) of a receiving area (41) of the RFID transponder (20, 21, 33, 42, 43) upon passage, the safety apparatus (25, 38, 51, 59) using the position point or the entry point and the exit point for determining the real position.

11. The method according to claim 1,
wherein sensors (22, 31, 47, 50, 63) disposed on the carriage (28) at a relative distance LS and markings (19, 30, 46, 48, 63) disposed on the rail (12, 29, 49, 67) at a relative distance L are used, the following holding true: LS=L or LS>L, preferably LS=n*L, with n=1, 2, 3.

12. The method according to claim 1,
wherein sensors (22, 31, 47, 50, 63) disposed on the carriage (28) at a relative distance LS and markings disposed on the rail (12, 29, 49, 67) at a relative distance L1 and L2 are used, the following holding true: LS=n*L1 and L1< >L2, preferably LS=L1 and L1<L2.

13. The method according to claim 1,
wherein sensors (22, 31, 47, 50, 63) disposed on the carriage (28) at a relative distance LS and markings (19, 30, 46, 48, 63) disposed on the rail (12, 29, 49, 67) at a relative distance L are used, the following holding true: LS≠L or LS=9/10 L.

14. The method according to claim 1,
wherein a switch signal of an end switch of the sensor apparatus (14, 40, 70) is detected and transmitted to the control device (13) by means of the safety apparatus (25, 38, 51, 59) in order to control the drive unit (11).

15. A control unit (10) for conveyor means, the conveyor means comprising a drive unit (11) and the control unit for controlling the drive unit, a carriage (28) of the conveyor means being movable along a rail (12, 29, 49, 67) of the conveyor means by means of the drive unit, the control unit comprising a control device (13) by means of which the drive unit is controllable, the control unit comprising a rotary encoder (16, 36, 56) which is connectable to a shaft (18) of the drive unit or of a measuring wheel of the carriage for registering a rotation of the shaft, the rotary encoder comprising an encoder device (17, 37, 52, 58) by means of which a rotation angle signal, a rotational speed signal or a position value is transmittable to the control device in order to determine an assumed position of the carriage on the rail, wherein the control unit has a safety device (71) having a sensor apparatus (14, 40, 70) positionable on the carriage and the rail, at least one position signal being detectable by means of the sensor apparatus, the safety device having a safety apparatus (25, 38, 51, 59) by means of which a real position of the carriage on the rail is determinable based on the position signal, the assumed position being correctable according to the real position by means of the safety device, wherein the position signal is generated by means of at least one sensor (22, 31, 47, 50, 63) of the sensor apparatus (14, 40, 70) disposed on the carriage (28) when passing markings (19, 30, 46, 48, 63) of the sensor apparatus disposed on the rail (12, 29, 49, 67), and wherein the sensor apparatus (14, 40, 70) comprises at least two sensors (22, 31, 47, 50, 63) disposed on the carriage (28) and a plurality of markings (19, 30, 46, 48, 63) disposed along the rail (12, 29, 49, 67), passive RFID transponders (20, 21, 33, 42, 43) being used as markings and RFID transceivers (23, 34, 41) being used as sensors.

16. The control unit according to claim 15, wherein the rotary encoder (16, 36, 56) has the safety apparatus (25, 38, 51, 59).

17. The control unit according to claim 15, wherein the rotary encoder (16, 36, 56) has a field bus interface (61) or a switching output (60) for exceeding or not meeting a scaled output value capable of parametrization or dependent on position.

18. The control unit according to claim 15, wherein the rotary encoder (16, 36, 56) is an incremental encoder or an absolute encoder.

19. Conveyor means (27), in particular hoisting gear, cranes, gantry cranes, container cranes or the like, the conveyor means comprising a control unit (10) according to claim 15, at least one rail (12, 29, 49, 67), a carriage (28) movable along the rail and a drive unit (11) having an electric motor.

* * * * *